United States Patent [19]
Janycky

[11] 3,935,515
[45] Jan. 27, 1976

[54] CURRENT AUXILIARY RELAY FOR CIRCUIT BREAKER

[76] Inventor: Lubomyr Janycky, 2508 Brown St., Philadelphia, Pa. 19130

[22] Filed: Mar. 21, 1975

[21] Appl. No.: 560,787

[52] U.S. Cl. .............................................. 317/155
[51] Int. Cl.² ........................................ H02H 3/04
[58] Field of Search..... 317/154, 155, 155.5, 33 SC, 317/DIG. 6; 340/253 A, 253 B

[56] References Cited
UNITED STATES PATENTS

| | | | |
|---|---|---|---|
| 2,669,664 | 2/1954 | Poznik | 317/155 X |
| 3,258,758 | 6/1966 | Byrd | 340/253 A |
| 3,611,043 | 10/1971 | Steen | 317/33 SC |

Primary Examiner—R. N. Envall, Jr.
Attorney, Agent, or Firm—Paul & Paul

[57] ABSTRACT

In a circuit breaker control installation, an electromechanical current auxiliary relay is provided having a series primary coil of relatively few turns wound over an isolated shunt secondary coil of many turns. Both coils are wound on a magnetic core which is integral with the armature of the trip-alarm relay. A diode is connected in series with the secondary coil having such polarity that collapse of current in the series primary winding energizes the shunt secondary winding in a direction to circulate current through the diode thereby holding the armature of the trip-alarm relay in closed-contacts position, thereby providing a substantially longer contact closure time delay for the alarm circuit.

8 Claims, 1 Drawing Figure

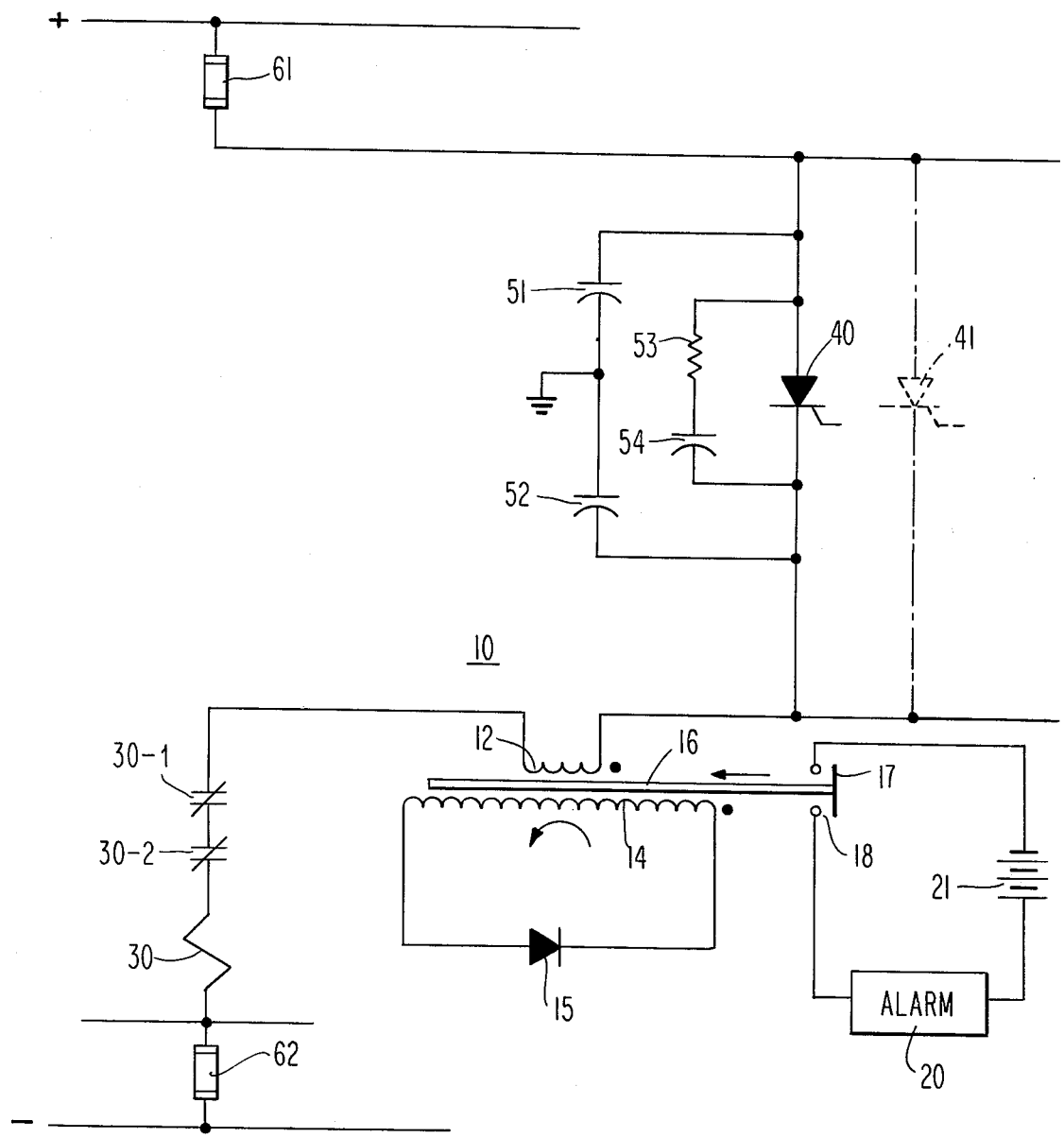

CURRENT AUXILIARY RELAY FOR CIRCUIT BREAKER

BACKGROUND OF THE INVENTION

This invention relates to circuit breakers and particularly to circuit breaker trip coils and trip alarm circuits.

Conventionally, circuit breaker trip coils are energized from a battery or other DC source. Each trip coil has in series a current auxiliary relay and a plurality of tripping contacts. The tripping contacts formerly were electromechanical devices but with the development and popularity of solid state devices, these electromechanical tripping contacts have now been supplanted by solid state devices, particularly silicon controlled rectifiers (SCR).

The current auxiliary relay functions to actuate and seal in the breaker trip alarm circuit when the breaker is tripped. The current auxiliary relay must have low impedance and adequate sensitivity and must also have a substantial time delay to ensure that the alarm circuit locks in before the relay is automatically de-energized.

Conventional current auxiliary relays, one example of which is the General Electric Company HGA relay formerly in general use for actuating trip alarms, are unsatisfactory when the circuit includes multiple solid state tripping contacts such as SCR's, because the HGA relay is unable to withstand, without contact closure, the inrush current of the substantial capacitance required for the paralleled SCR tripping contacts. This substantial capacitance is needed for supplying transient energy surge suppression and for slowing down the wave front to prevent operation of the SCR's during energizing of circuit. With the HGA relays, the charging of these capacitors resulted in incorrect tripping indications because they could not be adjusted for both adequate insensitivity and required time delay. The maximum time delay capability of the HGA relay is about 70 milliseconds (effectively 40 milliseconds because of contact bounce) and to obtain this much delay, a very close setting of the contacts is required. This increases the sensitivity and aggravates the probability of false trip indication due to capacitor inrush current. Also, because of the inadequate time delay of the HGA relay, it cannot be used for automatic circuit breaker reclosing.

SUMMARY OF THE INVENTION

A principal object of the present invention is to provide an electromechanical current auxiliary relay having substantially less resistance, substantially longer contact-closure time delay, substantially smaller contact bounce time, and a substantially larger operating pick-up current sufficient to enable the relay to withstand, without contact closure, the inrush current of the rate effect and surge suppression capacitors of several paralleled solid state SCR's, thereby to provide a relay having little or no danger of false trip-out indication.

BRIEF DESCRIPTION OF THE DRAWING

The single FIGURE of drawing is a schematic diagram of a portion of a typical circuit breaker control installation incorporating my new electromechanical current auxiliary relay.

DETAILED DESCRIPTION OF THE PREFERRED EMBODIMENT

As indicated above, the single FIGURE of drawing is a schematic diagram of a portion of a typical circuit breaker control installation incorporating my new electromechanical current auxiliary relay identified generally by the reference numeral 10.

Reference numeral 30 identifies the breaker trip coil; 30-1 and 30-2 represent its normally closed contacts, or so-called breaker trip coil a switch.

Reference numeral 40 identifies solid state tripping contacts in the form of a silicon controlled rectifier (SCR). A second tripping contact SCR (41) is shown in phantom to indicate that there will generally be a plurality of SCR's connected in parallel. Reference numerals 51 and 52 represent two capacitors which are connected in series across the SCR and which function as transient energy surge suppressors. The connection to ground is for protection against lightning surges and the like.

Capacitor 54 and resistor 53 which are series connected in shunt across the SCR's are the rate effect suppression elements. Elements 61 and 62 are fuses.

The new current auxiliary relay 10 comprises a series winding 12 having but few turns. When coil 12 is energized, the normally-open contacts 18 close. While the contact configuration illustrated in that of a double-pole single-throw relay having two normally open contacts, it should be understood that the current auxiliary relay 10 is also available in single-pole double-throw configuration with one normally-open and one normally-closed contact while the relay is de-energized.

Reference numeral 14 represents the secondary or shunt winding of the current auxiliary relay 10. This shunt winding 14 is insulated from series winding 12 and has a much larger number of turns. Also, the wire size of winding 14 is much smaller than that of series coil 12. Winding 14 is wound on a magnetic core 16, and primary winding 12 is wound on top of winding 14.

The magnetic core 16 is connected to, or integral with, armature 17. When the windings are energized, the core 16 is effective to pull the armature 17 against the pair of contacts 18, thereby closing the alarm circuit. The alarm circuit is represented simply by a battery 21 and an alarm device 20. The alarm device 20 may be a horn, or bell, or any other suitable form of alarm device.

Normally no current flows through the tripping contacts or SCR's 40 and 41, and no current flows through the breaker trip coil 30. When, however, tripping contact 40 or 41 (SCR's) is energized, current flows through the series winding 12 of the current auxiliary relay 10, through the normally closed contacts 30-1 and 30-2 of the breaker trip coil 30, and through the trip coil 30. When this happens, the normally-closed contacts 30-1 and 30-2 open and the current path is interrupted. This happens very quickly. Thus, the current flow through the series winding 12 is in the form of a current pulse. The leading or rising edge of this pulse is in such direction that the diode 15, which is connected in series across the secondary winding 14, blocks the flow of current. During the rise of the current pulse, the secondary winding 14 is in effect an open circuit, and the rise of the current pulse, which is dictated by the characteristics of the trip coil 30, is steep. The characteristics of the current auxiliary relay series coil 12 are of very low direct current resistance and inductance and therefore do not alter the current wave-shape of the trip coil.

When, however, the contacts 30-1 and 30-2 open, and this happens very quickly, the current through the winding 12 is interrupted. The trailing or falling edge of the pulse is in a direction to energize the secondary winding 14 in a direction to drive current through the diode 15. The relative polarity of the windings 12 and 14 is indicated by the dots at the right-hand end of each of the windings 12 and 14.

Since the number of turns on the secondary winding 14 is large, the inductance of the secondary winding is very great. Due to transformer action and the high inductance in winding 14, the energy stored in the magnetic circuit is large. Instead of having a rapid collapse of the current in the winding 12, the collapse of the magnetic field is very greatly delayed. As a result, the armature 17, which had been pulled up against the contacts 18 at the beginning of the current pulse through primary winding 12, is held against the contacts 18 for a time-delay period which is sufficiently long to maintain the alarm energized for a satisfactory period of time.

Without intending to be limited to the values about to be given, the following are the values of a current auxiliary relay which has been found to operate very satisfactorily:

Series coil 12 consists of 90 turns of No. 19 wire.
Shunt coil 14 consists of 31,000 turns of No. 40 wire.

The combination of coils 12 and 14 is wound on a ½ inch a-c core, 1⅜ inch diameter by 1 7/32 inch spool; first the shunt coil 14; then on top, the series coil 12.

The leads of the shunt coil 14 are brought out and shunted by a 1,000-volt controlled-avalanche diode rectifier 15, Edal B5M9, or equivalent.

The nominal d-c resistance of series coil 12 is 0.290 ohms.

The nominal d-c resistance of shunt coil 14 is 8300 ohms.

The relay 10 is factory calibrated with a 7/32 inch contact spacing and a steady state current pick-up of 2.3 amperes. The magnetic structure is finely adjusted to give a minimum time delay on drop-out of 250 milliseconds with a steady state resistive series coil current of 5 amperes for a time duration of 500 milliseconds.

It will be seen that the new current auxiliary relay 10, intended for use with trip coils for trip alarm, breaker reclosure or other control circuit applications, presents an extremely low impedance to the flow of the trip coil current, approximately three times less than the corresponding prior art relay. The time delay of the new relay is provided by transformer action and is totally isolated from the operating circuit current. The new relay is capable of withstanding, without contact closure, the inrush current of the rate effect and surge suppression capacitors (51, 52, 54). Reversal of current polarity will not damage the relay; it simply will not operate. This is a useful feature.

What is claimed is:

1. In a circuit breaker control installation having a trip coil and trip contacts and a current auxiliary relay for actuating a trip alarm:
   a. a trip alarm circuit normally open at the contacts of said current auxiliary relay;
   b. an armature in said current auxiliary relay for connecting said contacts to close said trip alarm circuit to actuate said alarm;
   c. a core of magnetizable material connected to said armature;
   d. a shunt coil having a large number of turns wound on said core;
   e. a diode in series with said shunt coil, said diode being poled to pass current in a direction to develop a magnetizing force tending to pull said core in a direction to move said armature in a contact-closing direction;
   f. a series coil having but relatively a few turns wound over but insulated from said shunt coil and in close coupling therewith;
   g. said series coil being in series circuit with the trip coil;
   h. said series circuit including solid state tripping contacts.

2. Apparatus according to claim 1 wherein said solid state tripping contacts comprises an SCR.

3. Apparatus according to claim 1 wherein said diode comprises a controlled-avalanche diode rectifier.

4. Apparatus according to claim 1 wherein the relationship between the number of turns of the shunt coil and the number of turns of the series coil is of the order of 3000 to 1.

5. Apparatus according to claim 1 wherein the wire of said shunt coil is of substantially smaller diameter than the wire of said series coil.

6. Apparatus according to claim 1 wherein transient energy surge suppression capacitors are connected in shunt across said SCR.

7. Apparatus according to claim 1 wherein a rate effect suppression capacitor is connected in shunt across said SCR.

8. Apparatus according to claim 1 wherein said solid state tripping contacts comprises an SCR, said diode comprises a controlled-avalanche diode rectifier, the wire of said shunt coil is of substantially smaller than the wire of said series coil, and the relationship between the number of turns of the shunt coil and the number of turns of the series coil is of the order of 3000 to 1.

* * * * *